United States Patent
Porter et al.

(10) Patent No.: US 11,768,337 B2
(45) Date of Patent: Sep. 26, 2023

(54) COUPLERS INCLUDING A WAVEGUIDE CORE WITH INTEGRATED AIRGAPS

(71) Applicant: GLOBALFOUNDRIES U.S. Inc., Malta, NY (US)

(72) Inventors: Spencer Porter, Colchester, VT (US); Mark Levy, Williston, VT (US); Siva P. Adusumilli, South Burlington, VT (US); Yusheng Bian, Ballston Lake, NY (US)

(73) Assignee: GlobalFoundries U.S. Inc., Malta, NY (US)

( * ) Notice: Subject to any disclaimer, the term of this patent is extended or adjusted under 35 U.S.C. 154(b) by 4 days.

(21) Appl. No.: 17/362,154

(22) Filed: Jun. 29, 2021

(65) Prior Publication Data
US 2022/0413232 A1    Dec. 29, 2022

(51) Int. Cl.
*G02B 6/42* (2006.01)
*G02B 6/122* (2006.01)
*G02B 6/12* (2006.01)

(52) U.S. Cl.
CPC .......... *G02B 6/4203* (2013.01); *G02B 6/1225* (2013.01); *G02B 2006/12104* (2013.01); *G02B 2006/12159* (2013.01)

(58) Field of Classification Search
None
See application file for complete search history.

(56) References Cited

U.S. PATENT DOCUMENTS

| | | |
|---|---|---|
| 6,707,597 B2 | 3/2004 | Hamada |
| 6,836,598 B2 | 12/2004 | Chen et al. |
| 6,907,169 B2 | 6/2005 | Vahala et al. |
| 7,224,862 B2 | 5/2007 | Noda et al. |
| 7,590,325 B2 | 9/2009 | Noda et al. |
| 8,189,968 B2 | 5/2012 | Chen et al. |
| 10,156,676 B1 | 12/2018 | Shank et al. |
| 10,393,960 B1 | 8/2019 | Shank et al. |
| 10,446,643 B2 | 10/2019 | Adusumilli et al. |
| 10,795,083 B1 | 10/2020 | Bian et al. |
| 2003/0048993 A1 | 3/2003 | Shi et al. |

(Continued)

FOREIGN PATENT DOCUMENTS

WO    WO-2006055602 A2 *    5/2006    ............. B82Y 20/00

OTHER PUBLICATIONS

Yusheng Bian et al., "Optical Couplers With Segmented Waveguides", filed Apr. 1, 2020 as U.S. Appl. No. 16/837,149.

(Continued)

*Primary Examiner* — Ryan A Lepisto
*Assistant Examiner* — Erin D Chiem
(74) *Attorney, Agent, or Firm* — Thompson Hine LLP; Anthony Canale

(57) ABSTRACT

Structures for a coupler and methods of forming a structure for a coupler. A structure for a directional coupler may include a first waveguide core having one or more first airgaps and a second waveguide core including one or more second airgaps. The one or more second airgaps are positioned in the second waveguide core adjacent to the one or more first airgaps in the first waveguide core. A structure for an edge coupler is also provided in which the waveguide core of the edge coupler includes one or more airgaps.

20 Claims, 12 Drawing Sheets

(56) References Cited

U.S. PATENT DOCUMENTS

| | | | |
|---|---|---|---|
| 2006/0072642 A1* | 4/2006 | Wang | B82Y 20/00 372/50.1 |
| 2014/0193115 A1 | 7/2014 | Popovic | |
| 2017/0146740 A1 | 5/2017 | Orcutt et al. | |
| 2019/0265406 A1* | 8/2019 | Shank | G02B 6/122 |

OTHER PUBLICATIONS

Yusheng Bian, "Polarization-Insensitive Directional Couplers", filed Oct. 21, 2020 as U.S. Appl. No. 17/076,326.

K. Giewont et al., "300-mm Monolithic Silicon Photonics Foundry Technology," in IEEE Journal of Selected Topics in Quantum Electronics, vol. 25, No. 5, pp. 1-11, Sep.-Oct. 2019, Art No. 8200611.

Y. Bian, et al., "Towards low-loss monolithic silicon and nitride photonic building blocks in state-of-the-art 300mm CMOS foundry," in Frontiers in Optics / Laser Science, B Lee, C. Mazzali.

Bian et al., "Monolithically Integrated Silicon Nitride Platform" OFC Jun. 10, 2021.

M. Rakowski, et al., "45nm CMOS—Silicon Photonics Monolithic Technology (45CLO) for next-generation, low power and high speed optical interconnects," in Optical Fiber Communication Conference (OFC) 2020, OSA Technical Digest Optical Society of America, 2020), paper T3H.3.

* cited by examiner

COUPLERS INCLUDING A WAVEGUIDE CORE WITH INTEGRATED AIRGAPS

BACKGROUND

The present invention relates to photonics chips and, more specifically, to structures for a coupler and methods of forming a structure for a coupler.

Photonics chips are used in many applications and systems, such as data communication systems and data computation systems. A photonics chip integrates optical components, such as waveguides, optical switches, optical power splitters, edge couplers and directional couplers, and electronic components, such as field-effect transistors, into a unified platform. Among other factors, layout area, cost, and operational overhead may be reduced by the integration of both types of components on the same chip.

A directional coupler is employed on a photonics chip to split propagating optical signals between different waveguide cores. A directional coupler includes sections of the different waveguide cores that are routed with a reduced lateral spacing, which is selected to promote optical coupling over a given coupling length. Conventional directional couplers possess a large footprint because a large coupling length and/or a tight spacing is needed to compensate for a lack of coupling strength between the waveguide core sections. These limitations can drive increased chip size and increase processing costs.

An edge coupler, also known as a spot-size coupler, is commonly used for coupling optical signals of a given mode from an optical fiber or laser to optical components on the photonics chip. The edge coupler may include a section of a waveguide core that defines an inverse taper. Corresponding to a direction of mode propagation, an inverse taper refers to a tapered section of a waveguide core characterized by a gradual increase in width along the mode propagation direction. The gradually-increasing cross-section area of an inverse taper supports mode transformation and mode size variation associated with mode conversion when light is transferred from the optical fiber or laser to the photonics chip.

Improved structures for a coupler and methods of forming a structure for a coupler are needed.

SUMMARY

In an embodiment of the invention, a structure for a directional coupler is provided. The structure includes a first waveguide core having one or more first airgaps and a second waveguide core including one or more second airgaps. The one or more second airgaps are positioned in the second waveguide core adjacent to the one or more first airgaps in the first waveguide core.

In an embodiment of the invention, a structure for an edge coupler is provided. The structure includes an interposer, an optical component, and a waveguide core arranged between the interposer and the optical component. The waveguide core includes one or more airgaps.

In an embodiment of the invention, a method of forming a directional coupler is provided. The method includes forming a first waveguide core and a second waveguide core, forming one or more first airgaps in the first waveguide core, and forming one or more second airgaps in the second waveguide core. The one or more second airgaps are positioned in the second waveguide core adjacent to the one or more first airgaps in the first waveguide core.

BRIEF DESCRIPTION OF THE DRAWINGS

The accompanying drawings, which are incorporated in and constitute a part of this specification, illustrate various embodiments of the invention and, together with a general description of the invention given above and the detailed description of the embodiments given below, serve to explain the embodiments of the invention. In the drawings, like reference numerals refer to like features in the various views.

FIGS. 6, 6A, 6B are cross-sectional views of the structure at a fabrication stage of the processing method subsequent to FIGS. 5, 5A, 6B.

DETAILED DESCRIPTION

Figure 1:
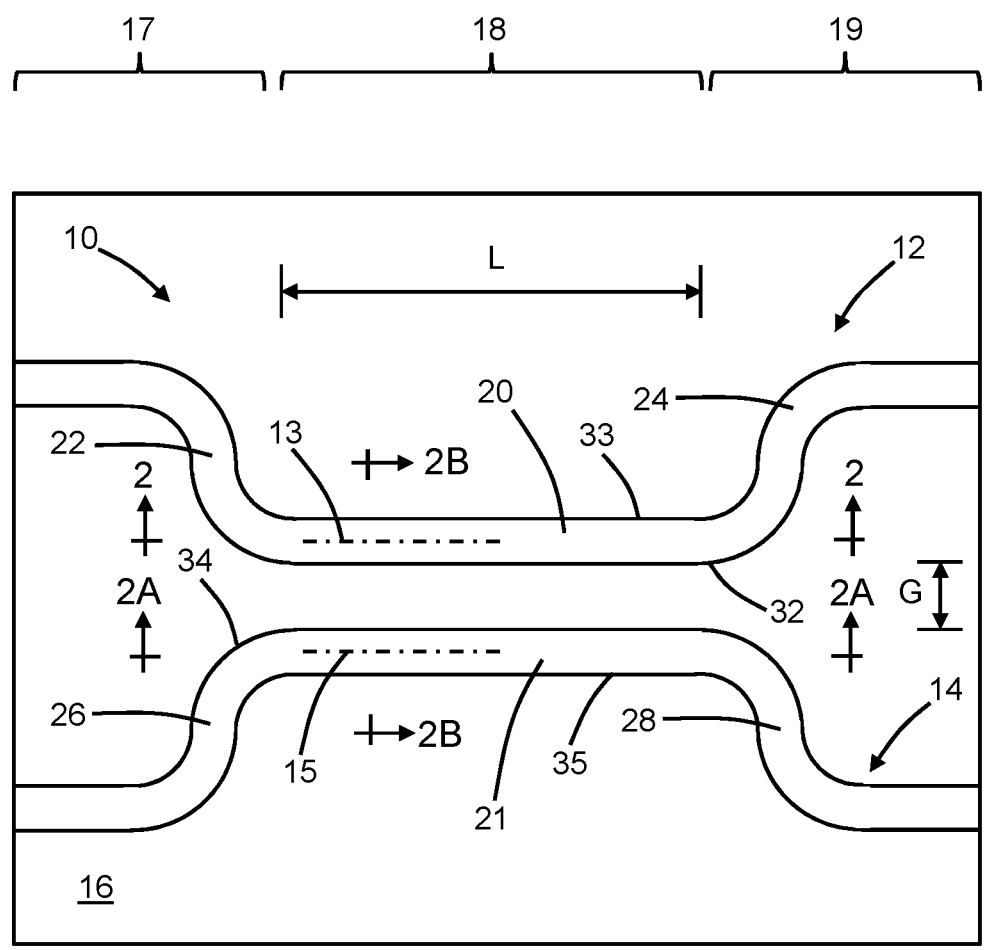
FIG. 1 is a top view of a structure at an initial fabrication stage of a processing method in accordance with embodiments of the invention.
Figure 2:
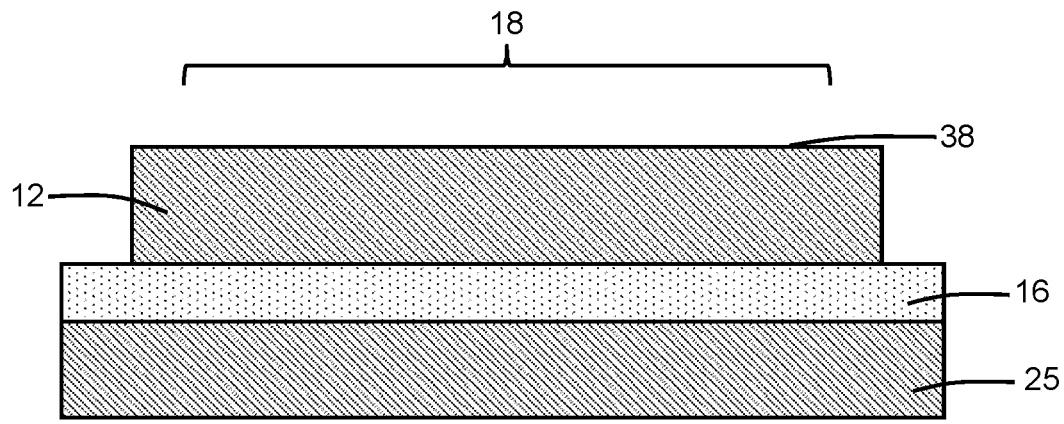
FIG. 2 is a cross-sectional view taken generally along line 2-2 in FIG. 1.
Figure 2A:
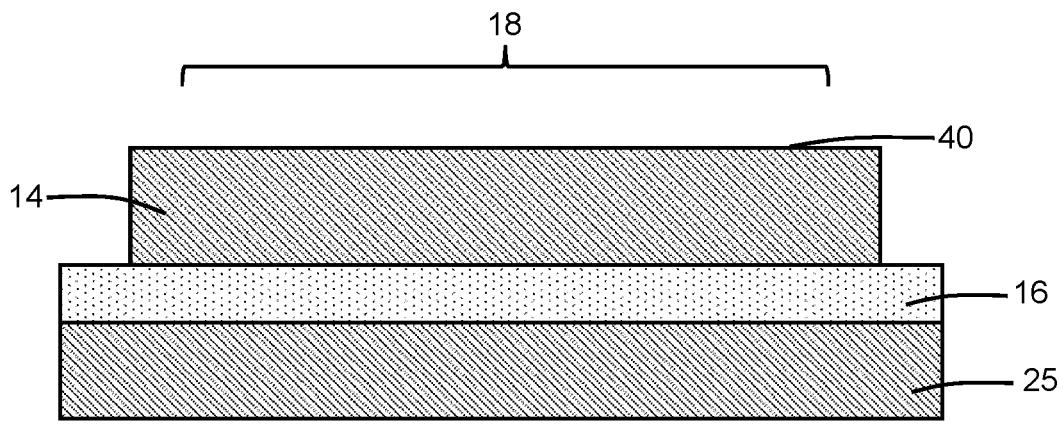
FIG. 2A is a cross-sectional view taken generally along line 2A-2A in FIG. 1.
Figure 2B:
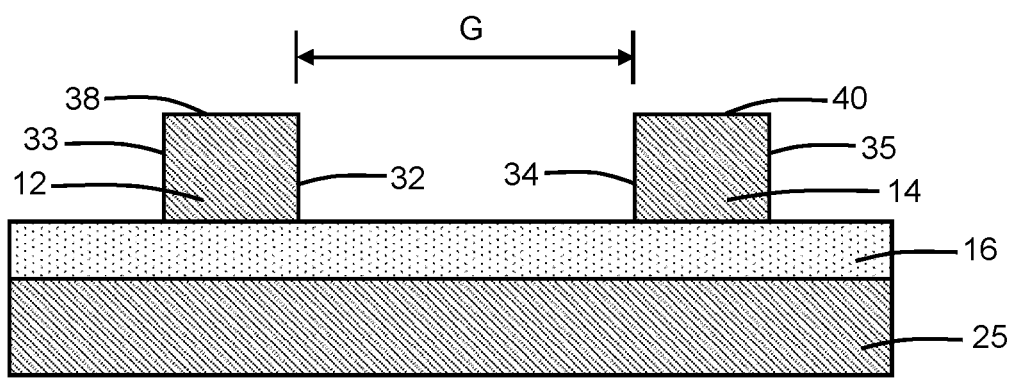
FIG. 2B is a cross-sectional view taken generally along line 2B-2B in FIG. 1.
Figure 3:
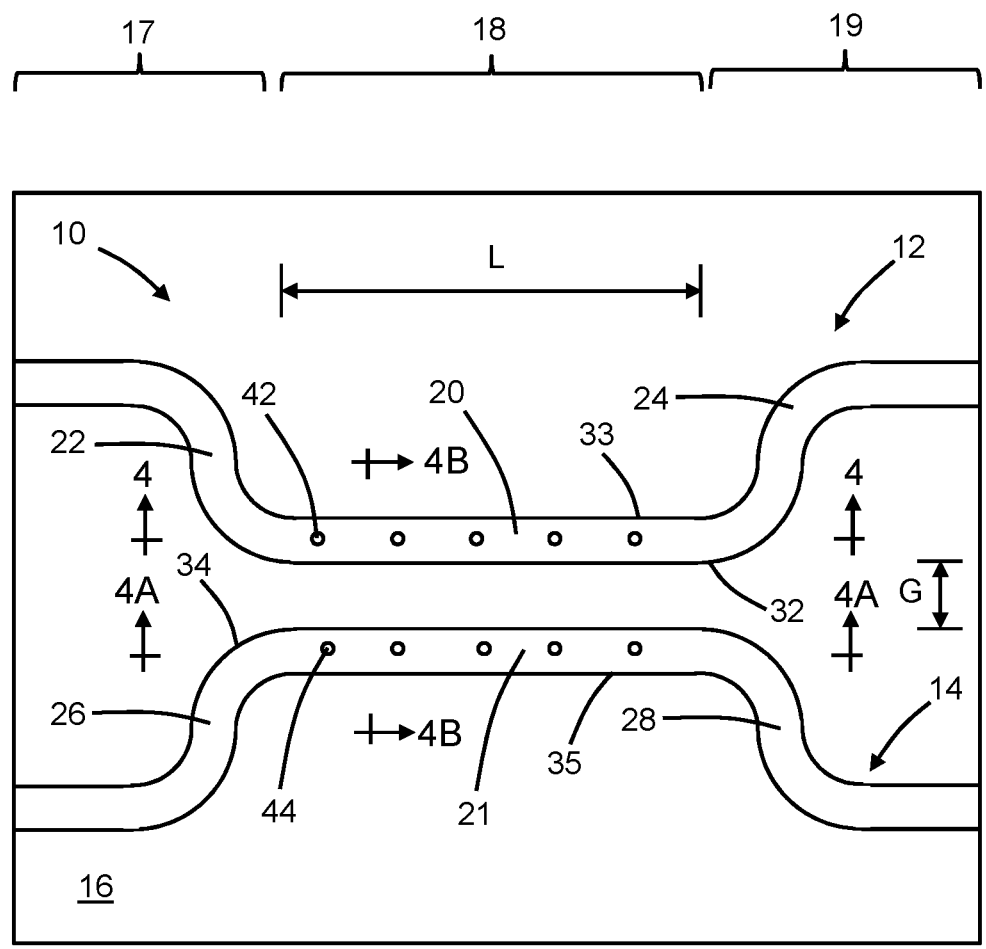
FIG. 3 is a top view of the structure at a fabrication stage of the processing method subsequent to FIG. 1.
Figure 4:
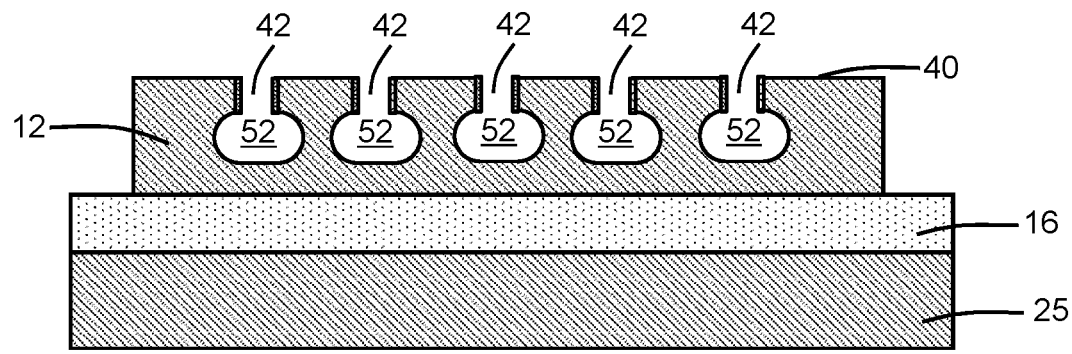
FIG. 4 is a cross-sectional view taken generally along line 4-4 in FIG. 3.
Figure 4A:
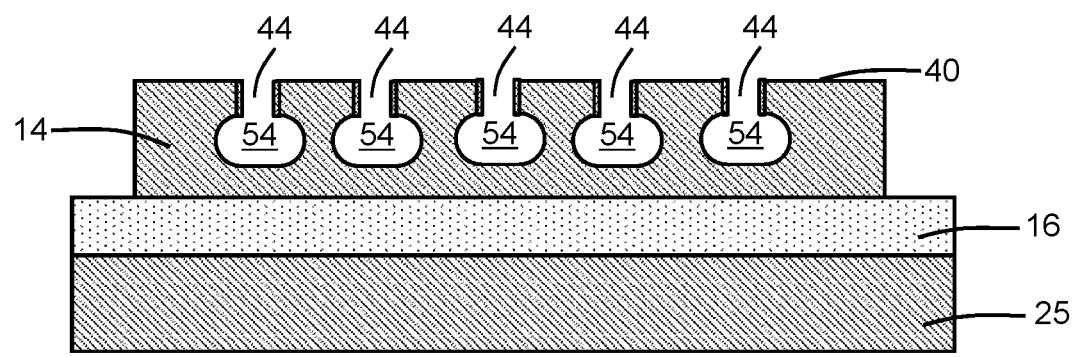
FIG. 4A is a cross-sectional view taken generally along line 4A-4A in FIG. 3.
Figure 4B:
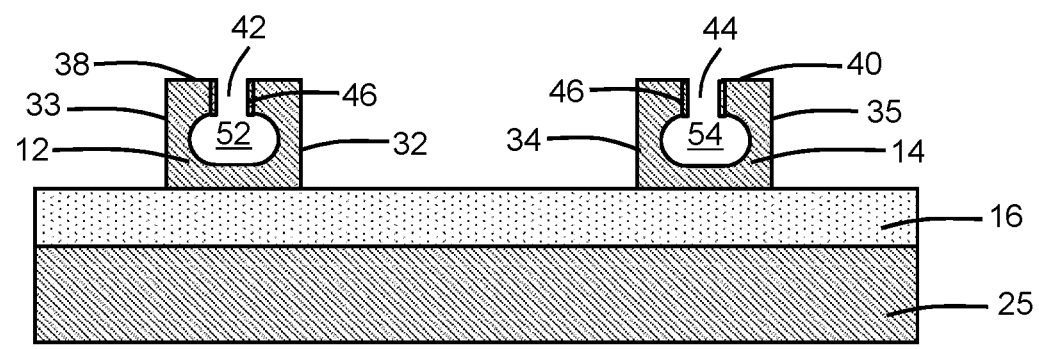
FIG. 4B is a cross-sectional view taken generally along line 4B-4B in FIG. 3.

With reference to FIGS. 1, 2, 2A, 2B and in accordance with embodiments of the invention, a structure 10 for an optical coupler includes a waveguide core 12 and a waveguide core 14. The waveguide cores 12, 14 may be positioned on a dielectric layer 16. In an embodiment, the waveguide cores 12, 14 may be comprised of a semiconductor material, such as single-crystal silicon. In an embodiment, the semiconductor material may originate from a device layer of a silicon-on-insulator (SOI) substrate that further includes a buried oxide layer providing the dielectric layer 16 and a substrate 25 comprised of a semiconductor material, such as single-crystal silicon. The waveguide cores 12, 14 may be formed by patterning the device layer with lithography and etching processes during front-end-of-line processing. The device layer of the silicon-on-insulator wafer may be fully etched to define ridge waveguides as shown or, alternatively, only partially etched near the waveguide cores 12, 14 to define rib waveguides.

The structure 10 has a coupling region 18 in which a section 20 of the waveguide core 12 extends longitudinally along a longitudinal axis 13, and a section 21 of the waveguide core 14 extends longitudinally along a longitudinal axis 15. The section 20 of the waveguide core 12 and the neighboring section 21 of the waveguide core 14 are positioned adjacent to each other in the coupling region 18. In the coupling region 18, the longitudinal axis 13 of the section 20 of the waveguide core 12 in the coupling region 18 may be arranged parallel to the longitudinal axis 15 of the neighboring section 21 of the waveguide core 14.

The waveguide core 12 further includes a set of curved sections 22 in an input region 17 of the structure 10 and a set of curved sections 24 in an output region 19 of the structure 10. The section 20 is longitudinally positioned between the curved sections 22 and the curved sections 24 with the curved sections 22 adjoined to one end of the section 20 and the curved sections 24 adjoined to an opposite end of the section 20. The curved sections 22 may be curved in opposite directions for routing the waveguide core 12 in the input region 17. The curved sections 24 may be curved in opposite directions for routing the waveguide core 12 in the output region 19. In an alternative embodiment, the section 20 may be tapered rather than straight.

The waveguide core 14 further includes a set of curved sections 26 in the input region 17 of the structure 10 and a set of curved sections 28 in the output region 19 of the structure 10. The section 21 is longitudinally positioned between the curved sections 26 and the curved sections 28 with the curved sections 26 adjoined to one end of the section 20 and the curved sections 28 adjoined to an opposite end of the section 21. The curved sections 26 may be curved in opposite directions for routing the waveguide core 14 in the input region 17. The curved sections 28 may be curved in opposite directions for routing the waveguide core 14 in the output region 19. In an alternative embodiment, the section 21 may be tapered rather than straight.

The waveguide core 12 has a top surface 38 and the waveguide core 14 has a top surface 40 that may be coplanar with the top surface 38. The waveguide core 12 has sidewalls in the form of opposite side surfaces 32, 33 that project upwardly from the dielectric layer 16 to the top surface 38, and the waveguide core 14 has sidewalls in the form of opposite side surfaces 34, 35 that project upwardly from the dielectric layer 16 to the top surface 40. In the coupling region 18, the side surface 32 of the section 20 of the waveguide core 12 is arranged adjacent to the side surface 34 of the section 21 of the waveguide core 14 over a length L. In an embodiment, the widths of the sections 20, 21 may be constant over their respective lengths.

The section 20 of the waveguide core 12 is laterally spaced from the section 21 of the waveguide core 14 by a smaller distance in the coupling region 18 than the distance separating the waveguide cores 12, 14 outside of the coupling region 18. In that regard, the side surface 32 of the section 20 of the waveguide core 12 may be arranged adjacent to, and aligned parallel with, the side surface 34 of the section 21 of the waveguide core 14 over the length L within the coupling region 18, and the side surfaces 32 and 34 may be separated in the coupling region 18 by a gap G, which may be uniform within the coupling region 18.

Outside of the coupling region 18, the side surface 32 of the waveguide core 12 and the side surface 34 of the waveguide core 14 diverge, and the side surfaces 32, 34 may be separated by respective gaps in the input region 17 and the output region 19 that are greater than the gap G. The sets of curved sections 22 and 24 in the input region 17 and the sets of curved sections 24 and 28 in the output region 19 contribute to provide the changes in separation between the side surface 32 of the waveguide core 12 and the side surface 34 of the waveguide core 14. Because of the larger distance between the side surfaces 32, 34 in the input region 17 and the output region 19, optical coupling between the waveguide cores 12, 14 may be negligible outside of the coupling region 18.

With reference to FIGS. 3, 4, 4A, 4B in which like reference numerals refer to like features in FIGS. 1, 2, 2A, 2B and at a subsequent fabrication stage, openings 42 are formed in the waveguide core 12 and openings 44 are formed in the waveguide core 14. The openings 42 may be arranged in a row in the waveguide core 12, and the openings 44 may be arranged in a row in the waveguide core 14. The openings 42, 44 may be patterned by lithography and etching processes using an etch mask and a directional etching process, such as reactive ion etching (ME), that forms the openings 42, 44 at the locations of the corresponding openings in the etch mask. A dielectric collar 46 may be formed inside each of the openings 42, 44. The dielectric collar 46 may be comprised of, for example, silicon dioxide.

Cavities 52 are formed as inclusions in the waveguide core 12 that extend outwardly from the bottoms of the openings 42, and cavities 54 are formed as inclusions in the waveguide core 14 that extend outwardly from the bottoms of the openings 44. The cavities 52, 54 may be formed by performing an isotropic etching process, and may be merged together by the isotropic etching process. The dielectric collar 46 masks the openings 42, 44 and thereby prevents enlargement during isotropic etching. In an embodiment, the cavities 52 may be unmerged and distributed at respective positions in a row extending along the longitudinal axis 13 of the section 20 of the waveguide core 12. In an embodiment, the cavities 54 may be unmerged and distributed at respective positions in a row extending along the longitudinal axis 15 of the section 21 of the waveguide core 14. The cavities 52 may be symmetrical about the openings 42 and cavities 54 may be symmetrical about the openings 44 due to the isotropic etching.

The openings 42 are arranged between the cavities 52 and the top surface 38 of the waveguide core 12. Similarly, the openings 44 are arranged between the cavities 54 and the top surface 40 of the waveguide core 14. The openings 42, 44 are subsequently plugged to seal the cavities 52, 54.

Figure 5:
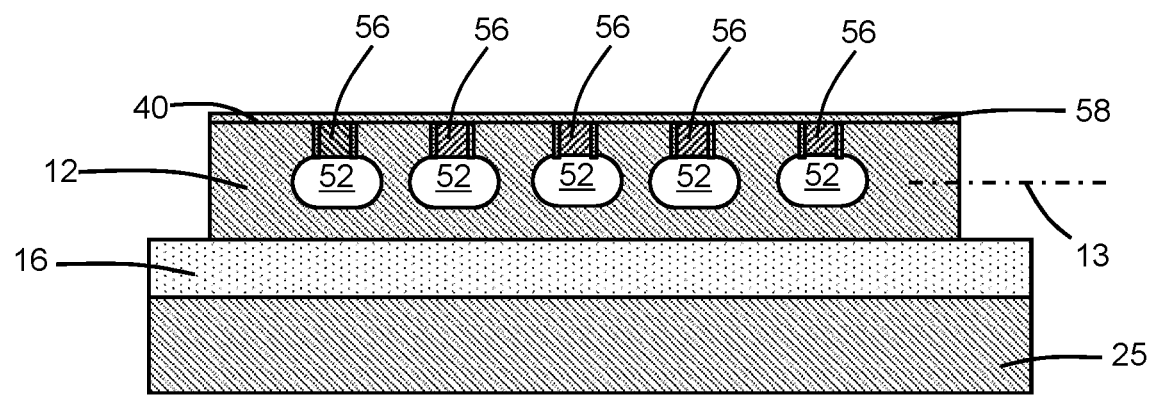
Figure 5A:
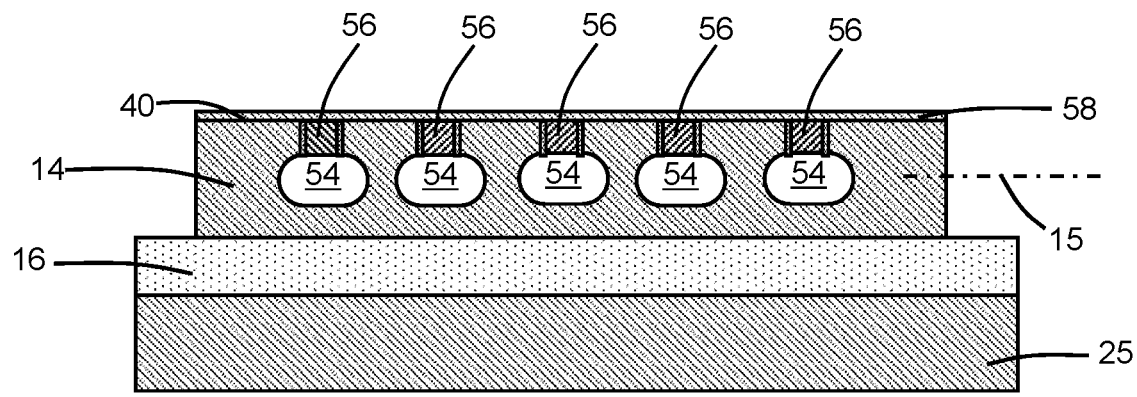
Figure 5B:
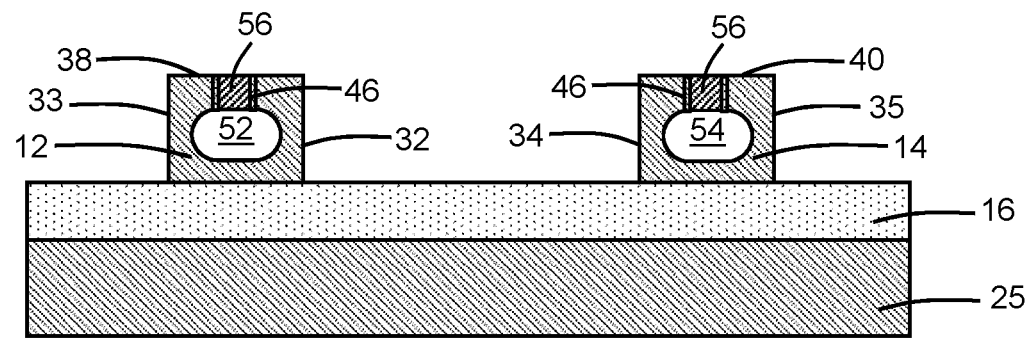

With reference to FIGS. 5, 5A, 5B in which like reference numerals refer to like features in FIGS. 3, 4, 4A, 4B and at a subsequent fabrication stage of the processing method, plugs 56 are formed inside the openings 42, 44 that close and seal the cavities 52, 54, and an epitaxial layer 58 may be epitaxially grown on the top surfaces 38, 40 of the waveguide cores 12, 14. The epitaxial layer 58 may be comprised of silicon. The plugs 56 may comprise a thin silicon-germanium layer that is epitaxially grown as a liner on the surfaces of the waveguide cores 12, 14 bordering the openings 42, 44 and silicon from the epitaxial layer 58. The epitaxial layer 58 may be formed using a low temperature epitaxial growth process, such as vapor phase epitaxy. The epitaxial growth may cause the previously-deposited thin silicon-germanium layer to reflow and combine with the semiconductor material of the epitaxial layer 58 to form the plugs 56 inside the openings 42, 44.

The sealed cavities 52, which are unmerged and discrete, define multiple airgaps in the waveguide core 12, and the sealed cavities 54, which are unmerged and discrete, define multiple airgaps in the waveguide core 14. The airgaps defined by the sealed cavities 52 and the airgaps defined by the sealed cavities 54 may be characterized by a permittivity or dielectric constant of near unity (i.e., vacuum permittivity). The airgaps defined by the sealed cavities 52 and the airgaps defined by the sealed cavities 54 may be filled with a gas, such as atmospheric air at or near atmospheric pressure.

Figure 6:
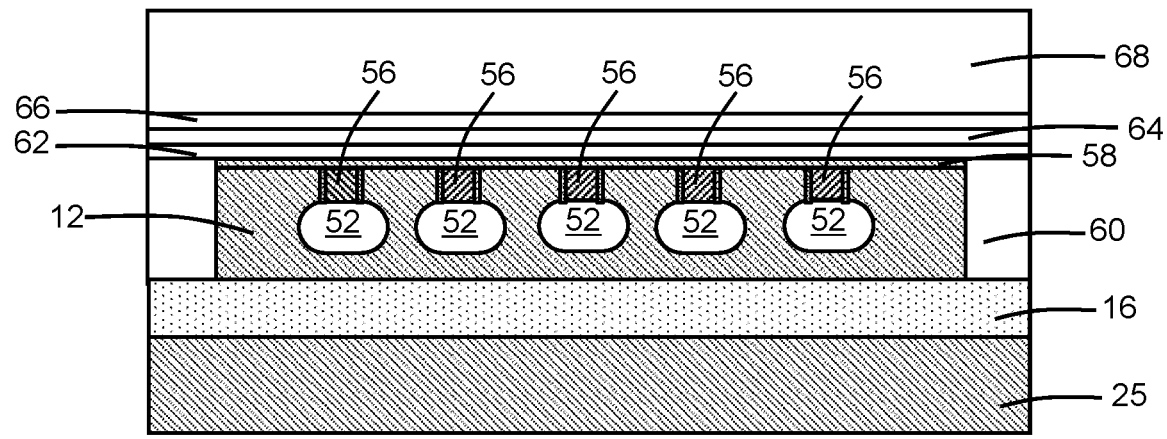
FIGS. 6, 6A, 6B are cross-sectional views of the structure at a fabrication stage of the processing method subsequent to FIGS. 5, 5A, 5B.
Figure 6A:
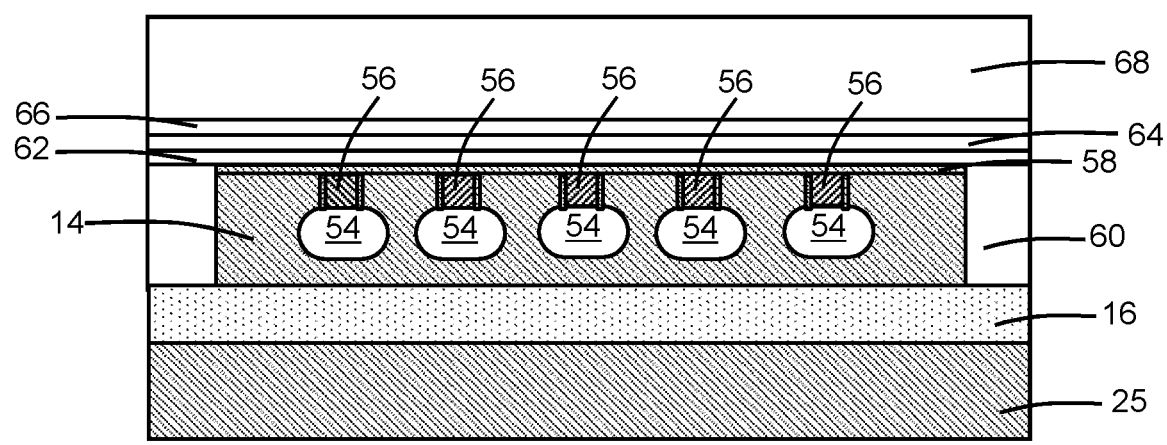
Figure 6B:
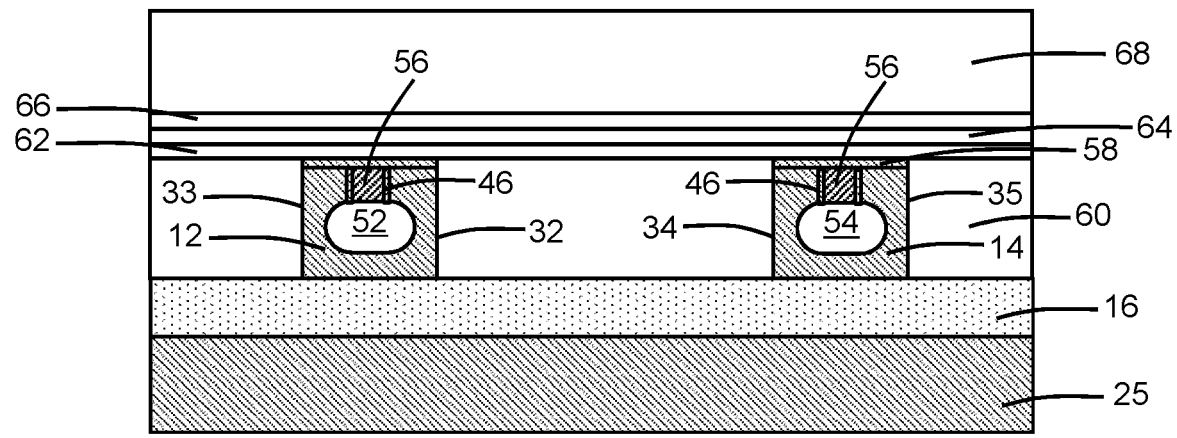

With reference to FIGS. 6, 6A, 6B in which like reference numerals refer to like features in FIGS. 5, 5A, 5B and at a subsequent fabrication stage, additional dielectric layers 60, 62, 64, 66 may be formed in a layer stack over the waveguide cores 12, 14. The dielectric layer 60, which may be comprised of silicon dioxide, may be planarized to be coplanar with the top surfaces of the waveguide cores 12, 14 and supplies lateral cladding. The dielectric layer 64 may be comprised of silicon nitride, and the dielectric layers 62, 66 may be comprised of silicon dioxide. In an alternative embodiment, the dielectric layer 64 containing silicon nitride may be omitted from the layer stack. A back-end-of-line stack 68 may be formed by back-end-of-line processing over the dielectric layer 66. The back-end-of-line stack 68 may include one or more dielectric layers comprised of a dielectric material, such as silicon dioxide, silicon nitride, or a low-k dielectric material.

The dielectric material of the dielectric layers 16, 60, 62 surrounding the waveguide cores 12, 14 provides low-index cladding that provides a refractive index contrast. The dielectric layers 16, 60, and 62 lack any cavities or voids, either filled or unfilled, that are proximate to the waveguide cores 12, 14.

The structure 10, in any of its embodiments described herein, may be integrated into a photonics chip that may include electronic components and additional optical components. The electronic components may include, for example, field-effect transistors that are fabricated by CMOS processing using the device layer of the silicon-on-insulator substrate.

In use, laser light may be guided on the photonics chip by the waveguide core 12 to the structure 10. The laser light is laterally transferred within the coupling region 18 through evanescent coupling from the waveguide core 12 to the waveguide core 14. In an embodiment, the coupling ratio may be approximately 50:50 such that about half of the laser light is laterally transferred from the waveguide core 12 to the waveguide core 14. The airgaps provided by the sealed cavities 52 and the sealed cavities 54 may operate to improve the optical coupling performance of the structure 10, which may permit the length L of the sections 20, 21 of the waveguide cores 12, 14 to be shortened and/or the dimension of the gap G between the waveguide cores 12, 14 to be increased. The sealed cavities 52 and the sealed cavities 54 may relax the index contrast, modify the mode distribution, and facilitate light interactions resulting in the improved optical coupling performance.

Figure 7:
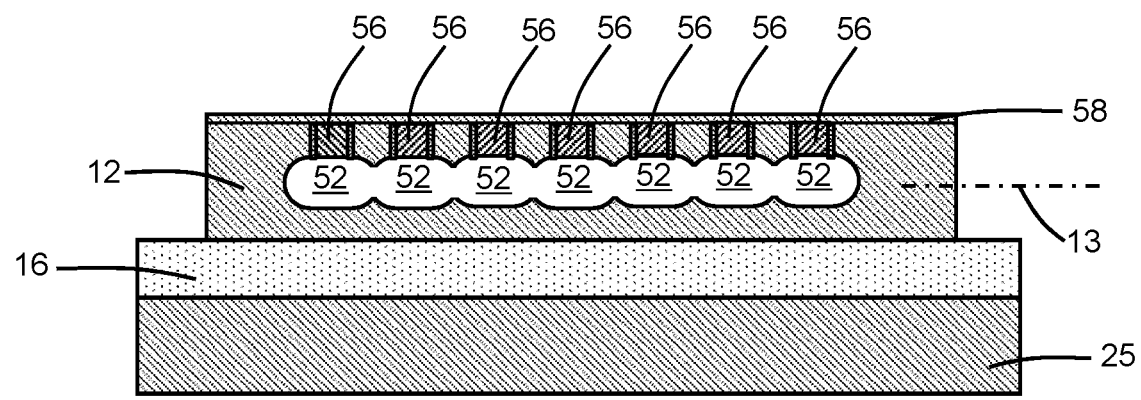
FIGS. 7, 7A are cross-sectional views of a structure in accordance with alternative embodiments of the invention.
Figure 7A:
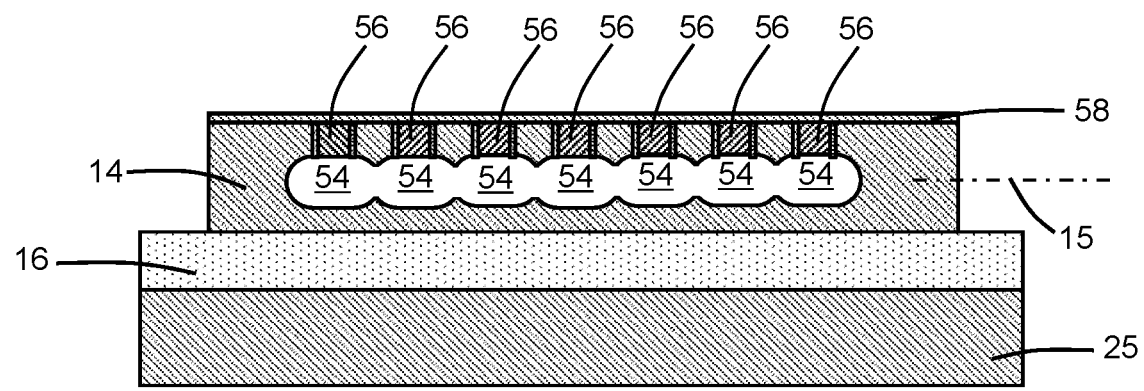

With reference to FIGS. 7, 7A in which like reference numerals refer to like features in FIGS. 5, 5A and in accordance with alternative embodiments of the invention, the cavities 52 in the waveguide core 12 may be merged and consolidated to define a single airgap in the waveguide core 12 that is sealed by multiple plugs 56, instead of multiple airgaps each individually sealed by a single plug 56. Similarly, the cavities 54 in the waveguide core 14 may be merged and consolidated to define a single airgap in the waveguide core 14 that is sealed by multiple plugs 56, instead of multiple airgaps each individually sealed by a single plug 56. In an embodiment, the pitch of the openings 42 in the waveguide core 12 and the pitch of the openings 44 in the waveguide core 14 may be decreased in order to promote merger of the cavities 52, 54 during the isotropic etching process due to the decreased spacing. The sealed single airgap provided by the merged cavities 52 extends lengthwise along the longitudinal axis 13 of the waveguide core 12 and, similarly, the sealed single airgap provided by the merged cavities 54 extends lengthwise along the longitudinal axis 15 of the waveguide core 14.

Figure 8:
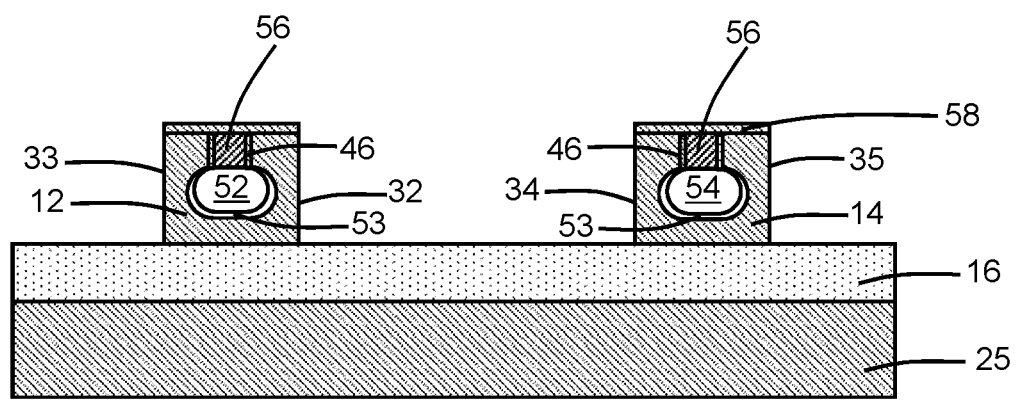
FIG. 8 is a cross-sectional view of a structure in accordance with alternative embodiments of the invention.

With reference to FIG. 8 and in accordance with alternative embodiments of the invention, a layer 53 of a solid material may be formed to line the cavities 52, 54, before sealing by the formation of the plugs 56, such that each of the cavities 52, 54 contains a combination of the solid material and air or gas. The composite filling of the cavities 52, 54 may permit further mode adjustment through the designation of the material and the thickness of the layer 53. In an embodiment, the composition of the material in the layer 53 may differ from the composition of the material of the waveguide cores 12, 14. For example, the material in the layer 53 may comprise silicon nitride or silicon dioxide for waveguide cores 12, 14 comprised of silicon. The cavities 52, 54 coated by the layer 53 may be unmerged, as shown in FIGS. 5, 5A, or, alternatively, may be merged, as shown in FIGS. 7, 7A, to define sealed single airgaps.

Figure 9:
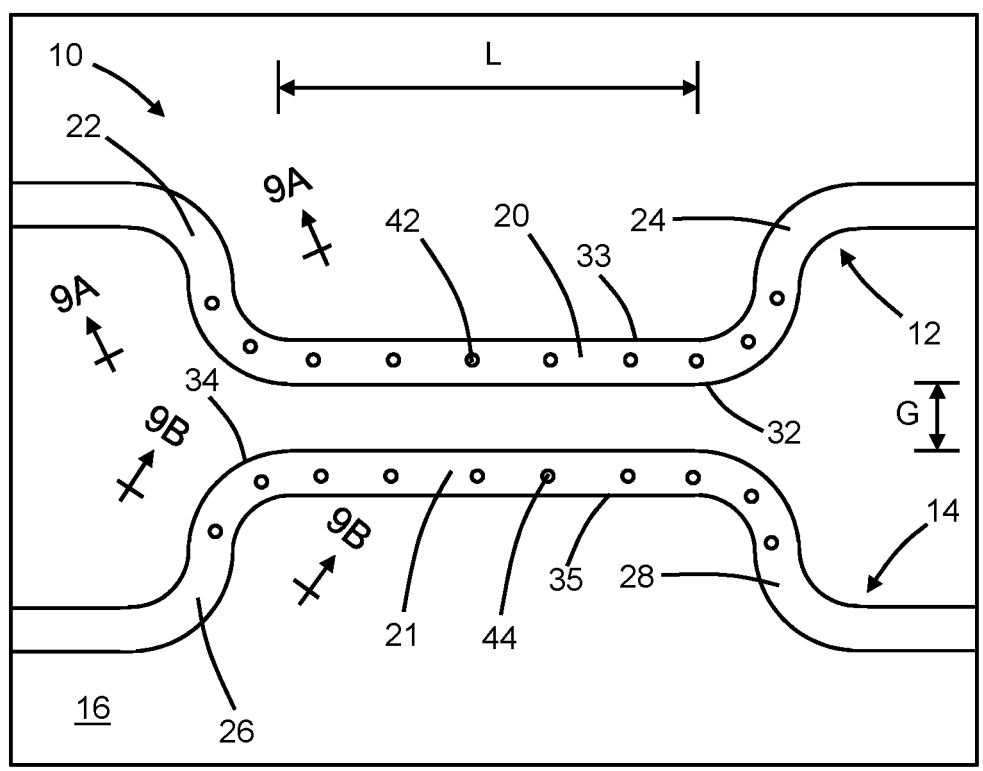
FIG. 9 is a top view of a structure in accordance with alternative embodiments of the invention.
Figure 9A:
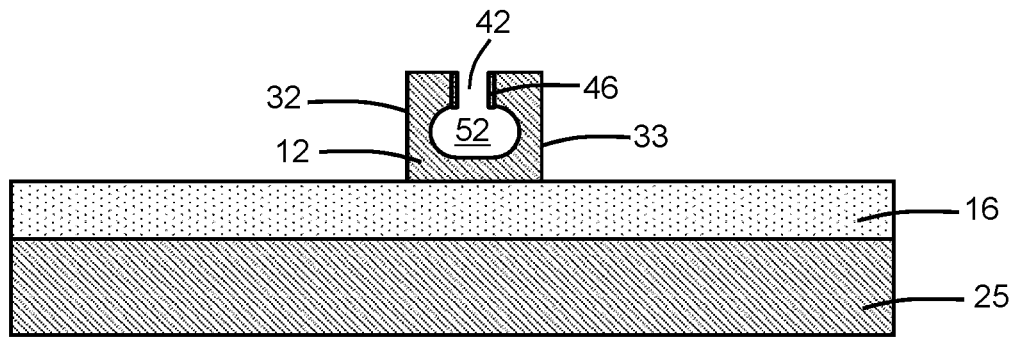
FIG. 9A is a cross-sectional view taken generally along line 9A-9A in FIG. 9.
Figure 9B:
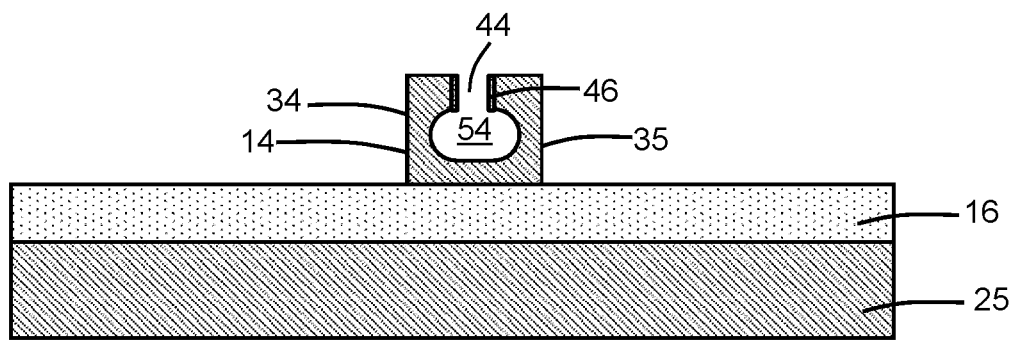
FIG. 9B is a cross-sectional view taken generally along line 9B-9B in FIG. 9.

With reference to FIGS. 9, 9A, 9B and in accordance with alternative embodiments of the invention, the openings 42 may also be formed in one or both of the curved sections 22 of the waveguide core 12, and the openings 42 may also be formed in in one or both of the curved sections 24 of the waveguide core 12. The openings 42 are connected to cavities 52 in the curved sections 22. The cavities 52 are subsequently plugged and sealed by the plugs 56. In an alternative embodiment, the openings 42 and cavities 52 may only be formed in one or both of the curved sections 22. In an alternative embodiment, the openings 42 and cavities 52 may only be formed in one or both of the curved sections 24. The cavities 52 in the curved sections 22 and/or curved sections 24 may be unmerged, as shown in FIG. 5, and define multiple airgaps after sealing. Alternatively, the cavities 52 in the curved sections 22 and/or curved sections 24 may be merged, as shown in FIG. 7, and merged with the merged cavities 52 in section 20 to define single airgaps after sealing.

Similarly, the openings 44 may also be formed in one or both of the curved sections 26 of the waveguide core 14, and the openings 44 may also be formed in in one or both of the curved sections 28 of the waveguide core 14. The openings 44 are connected to cavities 54. The cavities 54 are subsequently plugged and sealed by the plugs 56. In an alternative embodiment, the openings 44 and cavities 54 may only be formed in one or both of the curved sections 26. In an alternative embodiment, the openings 44 and cavities 54 may only be formed in one or both of the curved sections 28. The cavities 54 in the curved sections 26 and/or curved sections 28 may be unmerged, as shown in FIG. 5A, and define multiple airgaps after sealing. Alternatively, the cavities 54 in the curved sections 26 and/or curved sections 28 may be merged, as shown in FIG. 7A, and merged with the merged cavities 54 in section 21 to define single airgaps after sealing.

The placement of the cavities 52 in the curved sections 22 and/or the curved sections 24, in addition to placement of the cavities 52 in the section 20, may extend the coupling region 18 extends beyond the sections 20, 21 and partially into the curved sections 22, 24 and/or the curved sections 26, 28.

Figure 10:
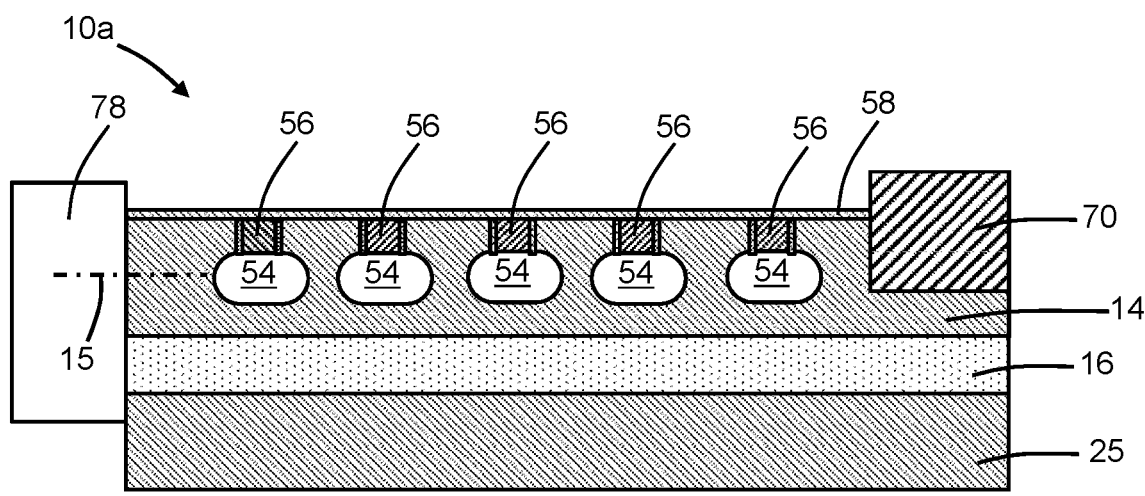
FIG. 10 is a cross-sectional view of a structure in accordance with alternative embodiments of the invention.

With reference to FIG. 10 and in accordance with alternative embodiments of the invention, the waveguide core 14 with the cavities 54 may be deployed in a different type of structure 10a, such as an edge coupler (i.e., a spot size converter) in which the waveguide core 14 is optically coupled through an interposer 78 to an optical fiber or a laser and the waveguide core 14 directs the light from the optical fiber or laser to an optical component, such as a photodetector 70. The cavities 54 may operate to enhance field confinement and reduce propagation loss, which may enhance the performance of the edge coupler. The cavities 54 may be unmerged and discrete to define multiple airgaps. In an alternative embodiment, the cavities 54 may be merged, as shown in FIG. 7A, to define a single airgap.

Figure 11:
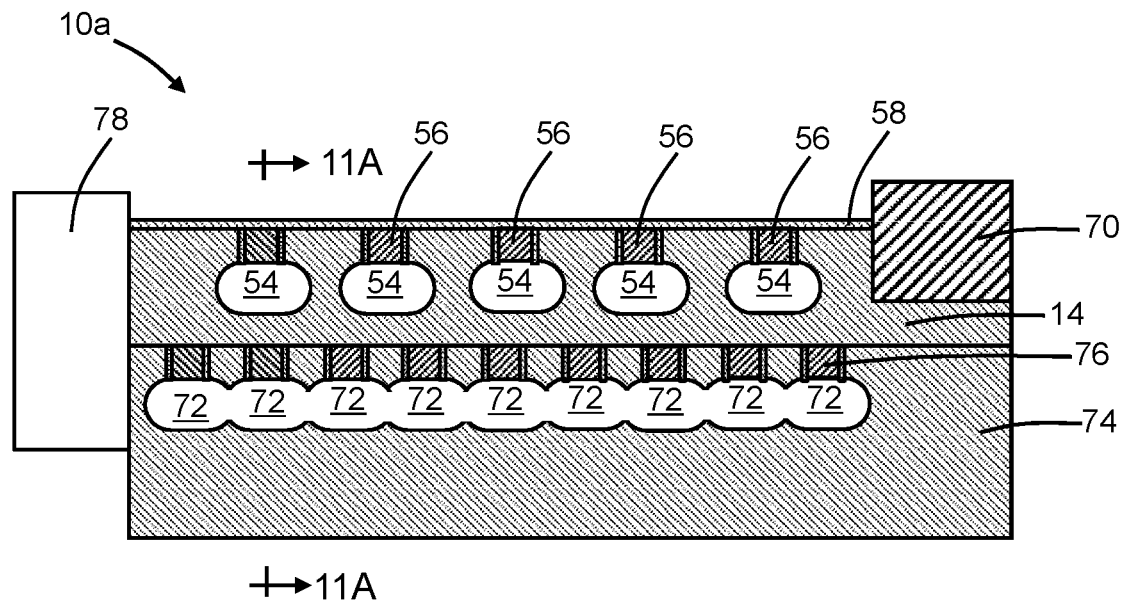
FIG. 11 is a cross-sectional view of a structure in accordance with alternative embodiments of the invention.
Figure 11A:
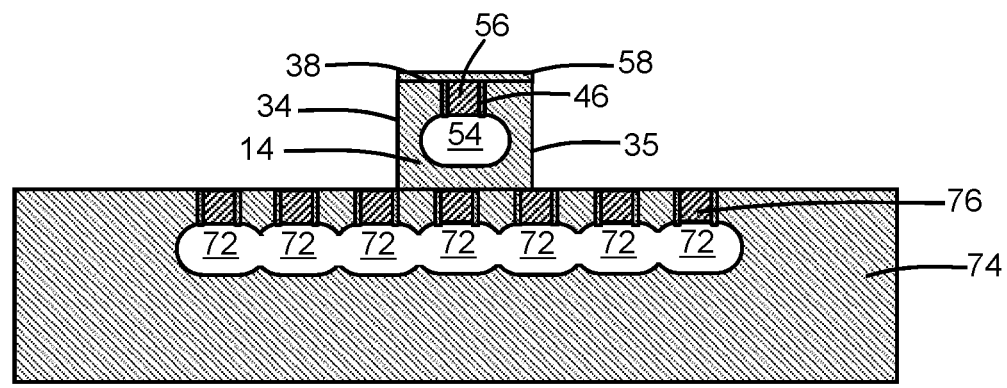
FIG. 11A is a cross-sectional view taken generally along line 11A-11A in FIG. 11.

With reference to FIGS. 11, 11A in which like reference numerals refer to like features in FIG. 10 and in accordance with alternative embodiments of the invention, the dielectric layer 16 may be replaced by a set of cavities 72 similar to the cavities 54 that are formed in a bulk substrate 74 in a manner similar to the formation of the cavities 54. In an embodiment, the bulk substrate 74 may be a silicon substrate. Each cavity 72 may be sealed by a plug 76 that is similar to plug 56 used to seal each cavity 54. In an embodiment, the cavities 72 may be merged to provide a single airgap. In an embodiment, the cavities 72 may be arranged in multiple rows and columns, and the multiple rows and columns of cavities 72 may be merged to provide the single airgap. The waveguide core 14 may be formed by a self-planarized epitaxial process over the bulk substrate 74 and above the cavities 72. The cavities 72 provide an optical isolation layer for the waveguide core 14 that, during use, behaves similarly to the dielectric layer 16 being replaced.

Figure 12:
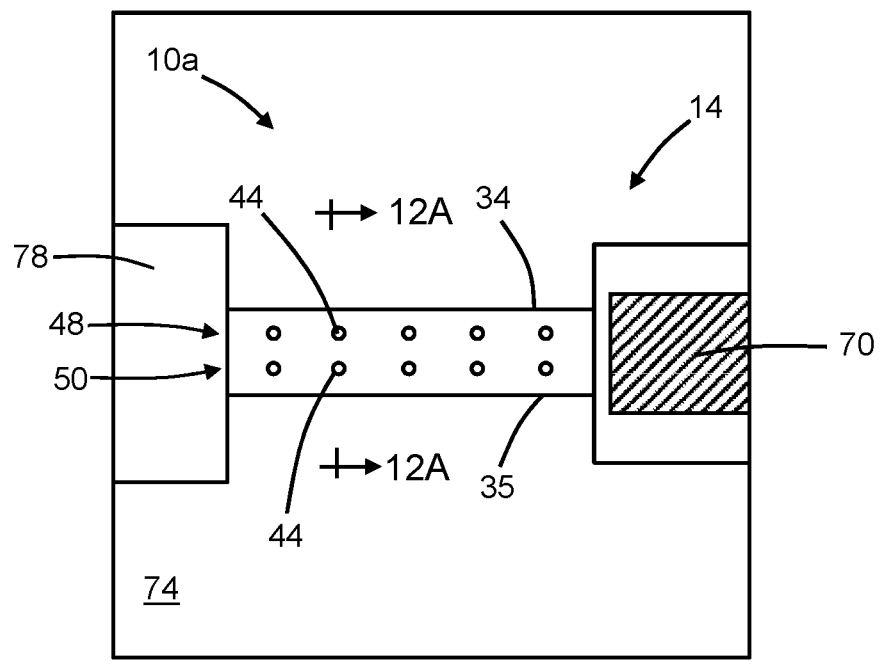
FIG. 12 is a cross-sectional view of a structure in accordance with alternative embodiments of the invention.
Figure 12A:
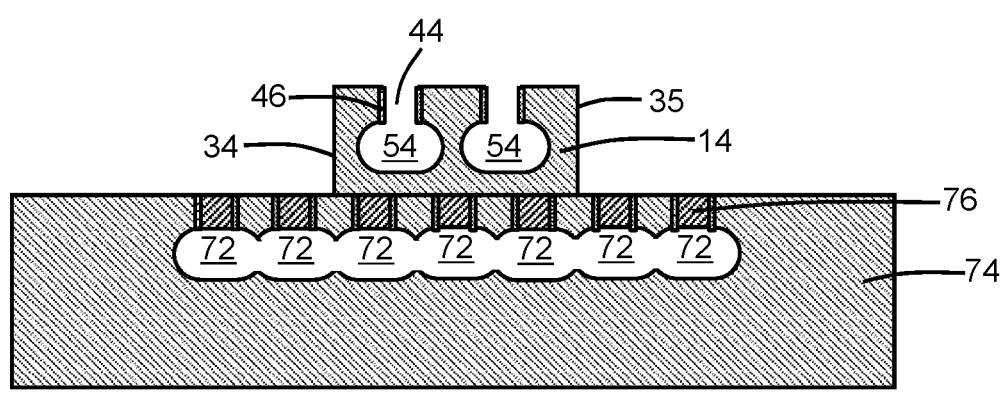
FIG. 12A is a cross-sectional view taken generally along line 12A-12A in FIG. 12.

With reference to FIGS. 12, 12A in which like reference numerals refer to like features in FIG. 11A and in accordance with alternative embodiments of the invention, the waveguide core 14 may be modified to include cavities 54 that are arranged in juxtaposed rows 48, 50. The cavities 54 in each of the rows 48, 50 may be unmerged distributed at positioned along the longitudinal axis 15. Solid material of the waveguide core 14 separates the row 48 of cavities 54 from the row 50 of cavities 54. In an embodiment, the cavities 54 in each of the rows 48, 50 may be unmerged, as shown in FIG. 5A, to define multiple airgaps. In an embodiment, the cavities 54 in each of the rows 48, 50 may be merged, as shown in FIG. 7A, to define single airgaps. Due to the multiple rows 48, 50 of cavities 54, the waveguide core 14 may function in a manner similar to a slotted waveguide core.

The methods as described above are used in the fabrication of integrated circuit chips. The resulting integrated circuit chips can be distributed by the fabricator in raw wafer form (e.g., as a single wafer that has multiple unpackaged chips), as a bare die, or in a packaged form. The chip may be integrated with other chips, discrete circuit elements, and/or other signal processing devices as part of either an intermediate product or an end product. The end product can be any product that includes integrated circuit chips, such as computer products having a central processor or smartphones.

References herein to terms modified by language of approximation, such as "about", "approximately", and "substantially", are not to be limited to the precise value specified. The language of approximation may correspond to the precision of an instrument used to measure the value and, unless otherwise dependent on the precision of the instrument, may indicate +/−10% of the stated value(s).

References herein to terms such as "vertical", "horizontal", etc. are made by way of example, and not by way of limitation, to establish a frame of reference. The term "horizontal" as used herein is defined as a plane parallel to a conventional plane of a semiconductor substrate, regardless of its actual three-dimensional spatial orientation. The terms "vertical" and "normal" refer to a direction perpendicular to the horizontal, as just defined. The term "lateral" refers to a direction within the horizontal plane.

A feature "connected" or "coupled" to or with another feature may be directly connected or coupled to or with the other feature or, instead, one or more intervening features may be present. A feature may be "directly connected" or "directly coupled" to or with another feature if intervening features are absent. A feature may be "indirectly connected" or "indirectly coupled" to or with another feature if at least one intervening feature is present. A feature "on" or "contacting" another feature may be directly on or in direct contact with the other feature or, instead, one or more intervening features may be present. A feature may be "directly on" or in "direct contact" with another feature if intervening features are absent. A feature may be "indirectly on" or in "indirect contact" with another feature if at least one intervening feature is present. Different features may "overlap" if a feature extends over, and covers a part of, another feature with either direct contact or indirect contact.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A structure for a directional coupler, the structure comprising:
   a first waveguide core including one or more first airgaps, a first top surface, a first plurality of openings arranged between the first top surface and the one or more first airgaps, and a collar inside each of the first plurality of openings, each of the one or more first airgaps extending outwardly from respective bottoms of first plurality of openings; and
   a second waveguide core including one or more second airgaps, the one or more second airgaps positioned in the second waveguide core adjacent to the one or more first airgaps in the first waveguide core.

2. The structure of claim 1 wherein the first waveguide core includes a first section and a second section adjoined to the first section, the second section of the first waveguide core is curved, and the one or more first airgaps are positioned in the first section and the second section of the first waveguide core.

3. The structure of claim 2 wherein the second waveguide core includes a first section and a second section adjoined to the first section, the first section of the first waveguide core is positioned adjacent to the first section of the second waveguide core, the second section of the second waveguide core is curved, and the one or more second airgaps are positioned in the first section and the second section of the second waveguide core.

4. The structure of claim 1 wherein the first waveguide core includes a first longitudinal axis, and the one or more first airgaps comprise a plurality of first airgaps that are distributed along the first longitudinal axis.

5. The structure of claim 4 wherein the second waveguide core includes a second longitudinal axis, and the one or more second airgaps comprise a plurality of second airgaps that are distributed along the second longitudinal axis.

6. The structure of claim 1 wherein the one or more first airgaps is a first single airgap, the first waveguide core includes a first longitudinal axis, and the first single airgap extends lengthwise along the first longitudinal axis.

7. The structure of claim 6 wherein the one or more second airgaps is a second single airgap, the second waveguide core includes a second longitudinal axis, and the second single airgap extends lengthwise along the second longitudinal axis.

8. The structure of claim 1 wherein the first waveguide core and the second waveguide core comprise a first material, the one or more first airgaps and the one or more second airgaps contain a gas, and further comprising:
a layer that lines the one or more first airgaps and the one or more second airgaps, the layer comprising a second material different than the first material.

9. The structure of claim 1 further comprising:
a plurality of plugs, each of the plurality of plugs positioned in one of the first plurality of openings such that the one or more first airgaps are closed and sealed.

10. The structure of claim 1 wherein the second waveguide core includes a second top surface, a second plurality of openings arranged between the second top surface and the one or more second airgaps, and a second collar inside each of the second plurality of openings, and each second airgap extends outwardly from respective bottoms of the second plurality of openings.

11. The structure of claim 1 further comprising:
a dielectric layer comprising a dielectric material,
wherein the first waveguide core includes a first sidewall and a second sidewall opposite from the first sidewall, the first sidewall and the second sidewall project upwardly from the dielectric layer to the first top surface, and the one or more first airgaps are positioned between the first sidewall and the second sidewall.

12. A structure for an edge coupler, the structure comprising:
an interposer;
an optical component; and
a waveguide core arranged between the interposer and the optical component, the waveguide core including one or more first airgaps, a top surface, a plurality of openings arranged between the top surface and the one or more first airgaps, and a dielectric collar inside each of the plurality of openings, and each of the one or more first airgaps extending outwardly from respective bottoms of plurality of openings.

13. The structure of claim 12 wherein the waveguide core includes a longitudinal axis, and the one or more first airgaps comprise a plurality of first airgaps that are at distributed in a first row along the longitudinal axis.

14. The structure of claim 13 further comprising:
one or more second airgaps positioned in the waveguide core adjacent to the one or more first airgaps,
wherein the one or more second airgaps comprise a plurality of second airgaps that are at distributed in a second row along the longitudinal axis.

15. The structure of claim 12 wherein the one or more first airgaps is a single airgap, the waveguide core includes a longitudinal axis, and the single airgap extends lengthwise along the longitudinal axis.

16. The structure of claim 12 further comprising:
a bulk semiconductor substrate; and
a third airgap in the bulk semiconductor substrate,
wherein the waveguide core is positioned on the bulk semiconductor substrate over the third airgap.

17. The structure of claim 12 wherein the optical component is a photodetector.

18. A method of forming a directional coupler, the method comprising:
forming a first waveguide core and a second waveguide core;
forming a plurality of openings in the first waveguide core;
forming a dielectric collar that is positioned inside each of the plurality of openings,
forming one or more first airgaps in the first waveguide core, wherein the plurality of openings are arranged between a top surface of the first waveguide core and the one or more first airgaps, and each of the one or more first airgaps extends outwardly from respective bottoms of plurality of openings; and
forming one or more second airgaps in the second waveguide core,
wherein the one or more second airgaps are positioned in the second waveguide core adjacent to the one or more first airgaps in the first waveguide core.

19. The method of claim 18 wherein the first waveguide core and the second waveguide core comprise a first material, the one or more first airgaps and the one or more second airgaps are filled with a gas, and further comprising:
forming a layer that lines the one or more first airgaps and the one or more second airgaps,
wherein the layer comprises a second material different than the first material.

20. The method of claim 18 wherein the one or more first airgaps and the one or more second airgaps are concurrently formed.

* * * * *